Oct. 25, 1932.　　F. W. WINTER　　1,884,469
COMBINATION HANDSAW
Filed June 19, 1930
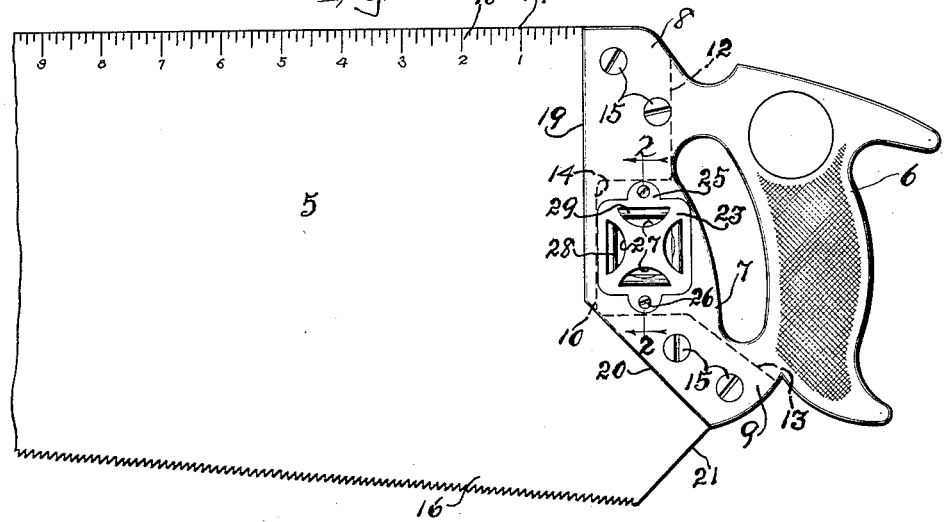
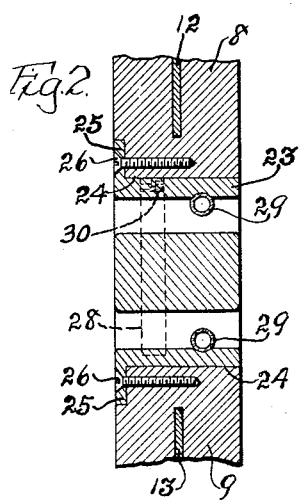
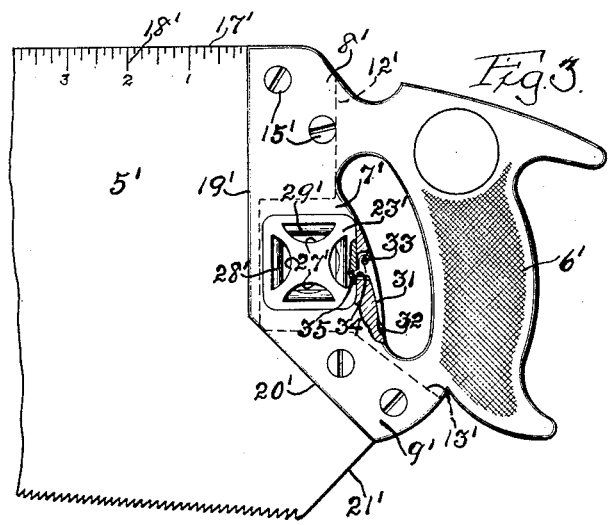
Inventor:
Fred W. Winter:
By J. Daniel Stuwe
Atty.

Patented Oct. 25, 1932

1,884,469

UNITED STATES PATENT OFFICE

FRED W. WINTER, OF CHICAGO, ILLINOIS

COMBINATION HANDSAW

Application filed June 19, 1930. Serial No. 462,274.

This invention relates to a combination handsaw.

The main object of this invention is to provide a combination tool which includes various features, so that it may be used as a saw, a rule, a square, a bevel, a plumb, and a four-way level. Another object is to provide an instrument which will serve the purpose of six or more of the ordinary tools generally used and carried about by a handyman, or a carpenter, or a similar mechanic, in order to expedite his work and to lighten his burden in carrying the tools with him. A further object is to make the handle of metal, preferably of aluminum, so that the handle and blade will be retained securely together, since with the usual wooden handle the rivets become loose, thereby loosening the handle on the blade and throwing the level out of adjustment. A still further object is to provide the device with a four-way level or a level having four bulbs for use in four different positions of the saw, and which level is effectively housed and protected so as to avoid breaking thereof through dropping of the combination saw.

These and other objects and advantages are attained with this invention, as will become apparent from the following description, taken in connection with the accompanying drawing in which:

Fig. 1 is a side elevation showing my invention in its preferred form of construction.

Fig. 2 is an enlarged cross-sectional view, taken on line 2—2 of Fig. 1.

Fig. 3 is a side elevational view, showing a slightly modified form of readily removable mounting means for the level mechanism in the handle.

The form of construction illustrated in the drawing comprises a saw blade 5, and a handle 6 which is provided in its attaching part or main part 7 with an irregular slot including two deep outer portions or pockets formed between upper jaws 8 and lower jaws 9, there being a shallow intermediate slot portion 10 therebetween. The blade has its attaching end arranged in the form of two outer extensions or ears 12 and 13 which are seated in the pockets between jaws 8 and 9 respectively, and has a portion 14 therebetween which fits in said slot portion 10. The extensions are secured in the slots and to the jaws by screws or fastening elements 15.

The saw blade 5 is of steel and has suitable saw teeth 16 provided on its front edge, while the back or rear edge 17 is arranged as a straight-edge and is also provided with scale markings 18 adjacent the edge, as indicated in the drawing, to provide a rule or gage.

The handle has its end portions which overlap the blade arranged to provide a pair of straight edges 19 which form with the blade edge 17 an angle of 90 degrees, on each side of the blade, so as to be adapted to serve as a square; and it is arranged with lower slanting edges 20, on each side of the blade, which provide with the edges 19 each an angle of forty-five degrees, to adapt the device for use as a bevel. An edge 21 of the blade, near the teeth 16, is also cut at a slant, preferably so as to form with each edge 20 of the handle an angle of 90 degrees, and also to form an angle of 45 degrees with a line extending through the rear edge 17 of the blade.

The level mechanism comprises a four-way level, or level with four bulbs arranged therein so as to be effective with the saw held in any one of four different positions; and the construction preferably includes a rectangular casing 23 which is mounted to fit closely in a rectangular opening 24 provided centrally through the main part 7 of the handle. The casing extends from one side of the handle to the other, preferably having its ends placed flush with the sides of the handle, and it has a pair of flanges or ears 25 seated in suitable notches or recesses in the handle and being held in position therein by screws 26. Semicylindrical holes 27 extend from end to end of said casing, one adjacent each of the four sides thereof, and one of the four level glasses or bulbs 28 and 29 extends across each hole, having its ends seated snugly in a bore which extends from one side wall of the casing into the other side wall, the bulb being retained in the bore by a plug or threaded closing element 30, as indicated in Fig. 2. One pair of the level glasses are placed parallel to each other and near one end of the casing, while the other pair are placed parallel to each other and near the other end of the casing, so that the ends of one pair of the glasses will be in overlapping relation with the other pair, and will extend into the walls of the casing, and can be readily inserted or removed if necessary.

The handle is preferably made of metal, like aluminum, since in the usual construction of saws of this type the handles consist of wood, and such wood becomes dry from age and exposure, and consequently permits the securing rivets or elements 15 to become loose, whereupon loose-play develops between the handle and the saw blade, and as a result thereof the level means invariably become inaccurate, in the saws heretofore constructed with wooden handles, and as now found upon the markets. The use of aluminum for the handle has thus become of considerable importance in saws of this type, provided with level means.

In Fig. 3 of the drawing a slightly modified form of mounting means for the level device is shown. The saw blade 5' has its extensions 12' and 13' secured in the jaws 8' and 9' of handle 6', with securing elements 15', like in the preceding form; and the gage 18' is provided at the rear straight-edge 17', likewise the angular edge portions 19', 20' and 21' are provided, as in the preceding form, and the handle is preferably constructed of aluminum. The four-way level means includes a casing 23' with semi-cylindrical holes 27' having level glasses 28' and 29' mounted therein. The means for securing the casing in the handle, however, is provided in the form of a lever 31 which is set into a groove 32 provided in part 7' of the handle and is pivoted therein by a pin 33. A tooth 34 on the lever engages in a notch 35 provided in the casing. By pulling the free end of the lever outward the tooth 34 is released and the casing may then be pressed out of the handle.

This form of level means and the mounting means therefor thus adapts the level means to be more readily removed from the handle, for repair or replacement, if necessary, than in the preceding form of construction, wherein the screws 26 need be removed for removing the casing 23 from the handle.

I claim as my invention:

A device of the class described, comprising a blade having a pair of ears thereon, a handle having a main attaching portion provided with a pair of pockets for receiving said ears and also having a hole extending through the handle intermediate said pockets, a leveling device including a notched casing mounted in said hole and being provided with a plurality of level bulbs protected in the casing and constituting a four-way level, and a latching lever pivotally mounted in said handle and engaging in the notch in said casing for holding it in the hole in the handle, so that the casing may be readily inserted in the handle and readily removed therefrom, the handle forming protection for the leveling device and the device being visible from both sides of the handle.

In testimony whereof I have signed my name to this specification.

FRED W. WINTER.